US012497525B2

(12) United States Patent
Albenge et al.

(10) Patent No.: US 12,497,525 B2
(45) Date of Patent: Dec. 16, 2025

(54) PROCESS OF PREPARATION OF AN AQUEOUS GEL INK WITH FIXED COLOR COMPRISING GOLD NANOPARTICLES

(71) Applicants: SOCIETE BIC, Clichy (FR); UNIVERSITE DE HAUTE ALSACE, Mulhouse (FR); CENTRE NATIONAL DE LA RECHERCHE SCIENTIFIQUE, Paris (FR)

(72) Inventors: Olivier Albenge, Clichy (FR); Romain Metillon, Clichy (FR); Karine Mougin, Paris (FR); Feriel Ghellal, Clichy (FR); Arnaud Spangenberg, Mulhouse (FR)

(73) Assignees: Société BIC, Clichy (FR); Universite de Haute Alsace, Mulhouse (FR); Centre National de la Recherche Scientifique, Paris (FR)

( * ) Notice: Subject to any disclaimer, the term of this patent is extended or adjusted under 35 U.S.C. 154(b) by 996 days.

(21) Appl. No.: 17/630,814

(22) PCT Filed: Aug. 28, 2020

(86) PCT No.: PCT/EP2020/074116
§ 371 (c)(1),
(2) Date: Jan. 27, 2022

(87) PCT Pub. No.: WO2021/038063
PCT Pub. Date: Mar. 4, 2021

(65) Prior Publication Data
US 2022/0275226 A1 Sep. 1, 2022

(30) Foreign Application Priority Data

Aug. 29, 2019 (EP) .................................... 19306052

(51) Int. Cl.
*C09D 11/17* (2014.01)
*B82Y 30/00* (2011.01)

(52) U.S. Cl.
CPC ............... *C09D 11/17* (2013.01); *B82Y 30/00* (2013.01)

(58) Field of Classification Search
CPC .................................................... C09D 11/17
See application file for complete search history.

(56) References Cited

U.S. PATENT DOCUMENTS

| 8,597,397 B2 | 12/2013 | Kunze et al. |
| 8,870,998 B2 | 10/2014 | Nolte et al. |
| 2005/0204956 A1 | 9/2005 | Berkei et al. |
| 2008/0295646 A1 | 12/2008 | Mirkin et al. |
| 2009/0258156 A1 | 10/2009 | Chretien et al. |
| 2014/0186529 A1 | 7/2014 | Sexton et al. |
| 2016/0257860 A1 | 9/2016 | Rink |

FOREIGN PATENT DOCUMENTS

| CN | 101027151 A | 8/2007 |
| CN | 106867315 A | 6/2017 |
| CN | 108530994 A | 9/2018 |
| CN | 108707369 A | 10/2018 |
| JP | H11302587 A | 11/1999 |
| JP | 2003221543 A | 8/2003 |
| JP | 2004307638 A | 11/2004 |
| JP | 2006299329 A | 11/2006 |
| JP | 2009033113 A | 2/2009 |
| JP | 2011195803 A | 10/2011 |
| JP | 2012251222 A | 12/2012 |
| JP | 2018035406 A | 3/2018 |
| JP | 2018095957 A | 6/2018 |
| WO | 2006072959 A1 | 7/2006 |
| WO | 2006132643 A2 | 12/2006 |
| WO | 2008111510 A1 | 9/2008 |
| WO | 2010146812 A1 | 12/2010 |
| WO | 2017014108 A1 | 1/2017 |

OTHER PUBLICATIONS

International Search Report and Written Opinion in International Application No. PCT/EP2020/074116, mailed Nov. 6, 2020 (13 pages).

*Primary Examiner* — Michael F Pepitone
(74) *Attorney, Agent, or Firm* — Bookoff McAndrews PLLC

(57) ABSTRACT

The present invention concerns a process for preparing in situ an aqueous gel ink with fixed color comprising the following steps: (i) preparing a gel-based matrix of aqueous ink comprising reducing agent chosen in the group consisting of citric acid and/or derivatives of citric acid, (ii) adding a solution of gold salts, (iii) adding iron powder, (iv) adding polyvinylpyrrolidone to obtain an aqueous gel ink with fixed color, wherein the steps (ii) and (iii) can be interchanged. The present invention also relates to an aqueous gel ink with fixed color obtained according to the process of the invention, comprising citric acid and derivatives, gold nanoparticles, and iron powder. The invention finally concerns a writing instrument comprising an aqueous gel ink with fixed color according to the invention.

15 Claims, No Drawings

PROCESS OF PREPARATION OF AN AQUEOUS GEL INK WITH FIXED COLOR COMPRISING GOLD NANOPARTICLES

CROSS-REFERENCE TO RELATED APPLICATIONS

This application is the U.S. national phase entry under 35 U.S.C. § 371 of International Application No. PCT/EP2020/074116, filed Aug. 28, 2020, which claims priority to European Patent Application No. 19306052.2, filed Aug. 29, 2019, the entire contents of which are incorporated herein by reference.

The present invention concerns a process for preparing in situ an aqueous gel ink with fixed color, and to aqueous gel inks with fixed color comprising reducing agent chosen in the group consisting of citric acid and/or derivatives of citric acid chosen from esters, amides and thioesters of citric acids, salts of citric acid or of said derivatives, solvates of citric acid or of said derivatives, such as hydrates, and mixture thereof, gold nanoparticles, and iron powder, obtained according to the process of the invention. The invention also concerns a writing instrument comprising an aqueous gel ink with fixed color according to the invention.

One of the main objectives of the present invention is to replace all type of dyes and pigments normally present in aqueous gel inks, which have the disadvantage of being expensive and causing high production costs.

Another objective of the present invention is to replace all types of and pigments normally present in aqueous gel inks, which have the disadvantage of being irritating to biological membranes, for example skin and eyes, and may cause allergies.

The inventors have surprisingly found that the new aqueous gel inks containing nanoparticles-based are also resistant to UV light thereby improving light stability over time.

To this end, the inventors have developed a specific process through which it is possible to obtain new aqueous gel inks with fixed color when writing by replacing former aqueous gel inks containing dyes and pigments by new ones that are nanoparticles-based. The process developed within the framework of the invention also presents the advantage of being performed in aqueous media, and therefore to be a "green process". In addition, the process of the invention is performed at low temperature ranges, works in an ecologically viable manner, and also takes account of ecological requirements.

The present invention thus relates to a process for preparing in situ an aqueous gel ink with fixed color comprising the following steps:
  (i) preparing a gel-based matrix of aqueous ink comprising reducing agent chosen in the group consisting of citric acid and/or derivatives of citric acid chosen from esters, amides and thioesters of citric acid, salts of citric acid or of said derivatives, solvates of citric acid or of said derivatives, such as hydrates, and mixture thereof,
  (ii) adding a solution of gold salts ($Au^{3+}$),
  (iii) adding iron powder,
  (iv) adding polyvinylpyrrolidone to obtain an aqueous gel ink with fixed color,
wherein the steps (ii) and (iii) can be interchanged.

The process of the invention is flexible in terms of use and performance, works in an ecologically viable manner, and also takes account of ecological requirements.

In the sense of the invention, the term "in situ" means that the gold nanoparticles present in the aqueous gel ink of the invention are synthetized directly in the gel-based matrix of the aqueous ink.

In the sense of the invention, the term "fixed color" is intended to mean that the color of the aqueous gel ink by visual observation is the same before application on absorbing support, and after application on absorbing support, specifically paper, cardboard or textiles, within 7 calendar days (one week).

For the purposes of the present invention, the term "ink" is intended to mean a "writing ink" which is intended to be used in a writing instrument, and in particular in a pen. A writing ink should not be confused with a "printing ink" which is used in printing machines and which does not have the same technical constraints and thus the same specifications. Indeed, a writing ink must not contain solid particles of which the size is greater than the channels of the writing instrument, in order to avoid blocking them, which would inevitably lead to writing being irreversibly stopped. In addition, it must allow an ink flow rate suitable for the writing instrument used, in particular a flow rate of between 100 and 500 mg/200 m of writing, and advantageously between 150 and 400 mg/200 m of writing. It must also dry sufficiently rapidly to avoid smudging the writing medium. It must also avoid the problems of migration (bleeding) over time. Thus, the ink according to the present invention will be suitable for the writing instrument for which it is intended, in particular for a pen.

In addition, a "writing ink" must not be too fluid, so as to avoid leaks during writing. However, it must be sufficiently fluid to facilitate the flow of the writing action.

In the particular case of the invention, the writing ink can be more specifically a "gel ink" (which corresponds therefore to a thixotropic ink), in particular the viscosity measured at rest (at a shear rate of $0.01\ s^{-1}$) at 20° C. is different and in particular higher than the viscosity measured with a shear rate of $100\ s^{-1}$ at 20° C. using the same rheometer such as a cone-and-plate rheometer for example Malvern KINEXUS with a cone of 60 mm and an angle of 1°. In a particular embodiment, the viscosity of the gel ink according to the present invention measured under these conditions ranges from 1,000 to 7,000 mPa·s, advantageously from 2,000 to 5,000 mPa·s, and more advantageously from 2,500 to 3,500 mPa·s, with a shear rate of $1\ s^{-1}$, and advantageously from 5 to 50 mPa·s, more advantageously from 7 to 40 mPa·s, and still more advantageously from 10 to 20 mPa·s with a shear rate of $5,000\ s^{-1}$. Advantageously, such a viscosity is stable during storage for at least three months at 40° C. and 20% relative humidity, in particular the viscosity will not have a more than 50% decrease. More advantageously, the return to viscosity at rest after shear is very quick, advantageously at most a few minutes, in order to avoid the static leakage in the minutes after writing.

According to a preferred embodiment, the process of the invention comprises the following steps, in the above order:
  (i) preparing a gel-based matrix of aqueous ink comprising reducing agent chosen in the group consisting of citric acid and/or esters of citric acid, salts and solvates of citric acid or of said esters derivatives, and mixtures thereof,
  (ii) adding a solution of gold salts to the gel-based matrix of aqueous ink prepared in step (i),
  (iii) adding iron powder to the dispersion of gold nanoparticles obtained in step (ii).
  (iv) adding polyvinylpyrrolidone to obtain an aqueous gel ink with fixed color wherein the steps (ii) and (iii) can be interchanged.

In the present invention, the gel-based matrix of aqueous ink prepared in step (i) may comprise from 50 to 95%, preferably from 60 to 90%, and more preferably from 70 to 85%, by weight of water.

The gel-based matrix of aqueous ink prepared in step (i) may also comprise classic gel ink ingredients such as solvents, antimicrobial agents, corrosion inhibitors, antifoam agents, rheology modifiers, etc. The gel ink ingredients used to prepare the gel-based matrix of aqueous ink of step (i) will be largely described below, in relation with the subject-matter of the aqueous gel ink with fixed color of the invention.

In the present invention, the reducing agent present in the gel-based matrix of aqueous ink of step (i) is chosen in the group consisting of citric acid and/or derivatives of citric acid chosen from esters, amides and thioesters of citric acids, salts of citric acid or of said derivatives, solvates of citric acid or of said derivatives, such as hydrates, and mixture thereof. This reducing agent helps reducing the gold salts to elemental metal (i.e. oxidation state: 0).

Citric acid is a weak organic acid of formula $HOOCH_2C—C(OH)COOH—CH_2COOH$. The derivatives of citric acid are chosen from esters, amides and thioesters of citric acid, salts of citric acid or of said derivatives, solvates of citric acid or of said derivatives, such as hydrates, and mixtures thereof. The suppliers of citric acid and/or derivatives are chosen among: Fluka™, Sigma-Aldrich™, TCI Chemicals™.

The esters of citric acid are preferably alkyl esters, preferably C1-30 alkyl esters, preferably C1-20 alkyl esters, preferably C1-6 alkyl esters. The esters of citric acid can be monoesters, diesters and/or triesters, preferably triesters of citric acid. The esters of citric acid used in the present invention include isodecyl citrate, isopropyl citrate, stearyl citrate, dilauryl citrate, distearyl citrate, tributyl citrate, tricaprylyl citrate, triethyl citrate, triethylhexyl citrate, trihexyldecyle citrate, triisocetyl citrate, trilauryl citrate, trioctyldodecyl citrate, trioleyl citrate, triisostearyl citrate, tristearyl citrates, ethyl citrates, tri-$C_{12-15}$-alkyl citrate such as tributyl citrate or triethyl citrate, tricaprylyl citrate, triethylhexyl citrate, triisocetyl citrate, trioctyldodecyl citrate, triisostearyl citrate, isodecyl citrate, stearyl citrate, dilauryl citrate, and ethyl citrate. Preferably, the esters of citric acid of the present invention are tributyl citrate and triethyl citrate.

The amides of citric acid used in the present invention may be prepared by the reaction of primary amines with citric acid. The amination reaction to form the amide may be performed using a variety of conditions well known in the organic chemical art as described in the *Kirk-Othmer Encyclopedia of Chemical Technology*, 4*th* Ed., Vol. 2, p. 348-351. The preferred method involves the reaction of citric acid with 3 or more equivalents in a protic solvent. All primary amines or mixtures of primary amines containing preferably the requisite C1 to C18 alkyl substituents may be utilized for the preparation of the tri-alkylcitramides of this invention. The alkyl groups in the citramides may be the same or different and may be linear or branched. Examples of suitable alkyl groups are methyl, ethyl, n-propyl, isopropyl, n-butyl, iso-butyl, sec-butyl, n-pentyl, 2-pentyl, 3-pentyl, iso-pentyl, neopentyl, cyclopentyl, 2-methylbutyl, 3-methyl-2-butyl, n-hexyl, 2-hexyl, 3-hexyl, cyclohexyl, 2-ethylbutyl, 4-methyl-2-pentyl, n-heptyl, n-octyl, n-2-ethylhexyl, n-nonyl, n-decyl, n-undecyl, n-dodecyl. Preferably, the amides of citric acid of the present invention are tri-butyl citramide and triethyl citramide.

The thioesters of citric acid used in the present invention may be prepared by the reaction of thiol and derivatives with citric acid. Several examples of thiols and derivatives can be used: allyl mercaptan, 2-aminoethanethiol, 2-aminobenzenethiol, 3-aminobenzenethiol, 4-aminobenzenethiol, 1,3-benzenedi methanethiol, 1,4-benzenedimethanethiol. Preferably, the thioester of citric acid is obtained by reaction between an allyl mercaptan and citric acid.

The salts of citric acid, also known as citrate salts, may come with various levels (mono-, di-, tri-) of different metal cations such calcium, potassium or sodium. Citric acid exists in greater than trace amounts in a variety of fruits and vegetables, most notably citrus fruits. The citrate salts are all produced by chemical reaction with citric acid and the hydroxide or carbonate of the respective salt.

The salts of citric acid used in the present invention include aluminium citrate, calcium citrate, copper citrate, diammonium citrate, disodium citrate, cupric citrate, ferric citrate, magnesium citrate, manganese citrate, monosodium citrate, potassium citrate, sodium citrate, zinc citrate. Preferably, the salts of citric acid of the present invention are sodium citrate, potassium citrate, and diammonium citrate.

The solvates of citric acid or of said derivatives in the present invention are chosen among citric acid monohydrate, citric acid trisodium salt dihydrate, citric acid disodium salt sesquihydrate. Preferably, the solvate of citric acid of the present invention is citric acid monohydrate.

The reducing agent may be added in the form of a solution or in the form of powder.

In a preferred embodiment, the concentration of reducing agent chosen in the group consisting of citric acid and/or derivatives of citric acid chosen from esters, amides and thioesters of citric acids, salts of citric acid or of said derivatives, solvates of citric acid or of said derivatives, such as hydrates, and mixture thereof in the gel-based matrix of aqueous ink of step (i) ranges from 0.10 to 0.50 mol·$L^{-1}$, preferably from 0.20 to 0.40 mol·$L^{-1}$, and more preferably from 0.25 to 0.35 mol·$L^{-1}$.

In the present invention, the solution of gold salts is preferably a solution of gold (III) chloride trihydrate $HAuCl_4·3H_2O$. Gold nanoparticles are formed when contacting the gold salts with the reducing agent chosen in the group consisting of citric acid and/or derivatives of citric acid chosen from esters, amides and thioesters of citric acids, salts of citric acid or of said derivatives, solvates of citric acid or of said derivatives, such as hydrates, and mixture thereof In a preferred embodiment, the concentration of gold salts in the gel-based matrix of aqueous ink of step (ii) ranges from 0.001 to 0.1 mol·$L^{-1}$, preferably 0.0015 to 0.08 mol·$L^{-}$1, and more preferably 0.002 to 0.06 mol·$L^{-1}$.

In a preferred embodiment, the molar ratio between the gold salts and the reducing agent chosen in the group consisting of citric acid and/or derivatives of citric acid chosen from esters, amides and thioesters of citric acids, salts of citric acid or of said derivatives, solvates of citric acid or of said derivatives, such as hydrates, and mixture thereof ranges from 0.005:1 to 0.05:1, preferably from 0.01:1 to 0.03:1. More preferably, when the reducing agent is citric acid, the molar ratio between the gold salts and citric acid ranges from 0.015:1 to 0.025:1.

In the present invention, the concentration of polyvinylpyrrolidone in the aqueous gel ink of step (iv) ranges from 0.005 to 0.1%, preferably from 0.01 to 0.05%.

In the present invention, the iron powder is advantageously constituted of iron nanoparticles having an average particle size ranging from 20 to 100 nm, and preferably from 30 to 60 nm. This average particle size is determined by analysis of 2D images (microscope: JEOL ARM 200), according to the standard ISO9001:2015.

In a preferred embodiment, the concentration of iron powder in the aqueous gel ink with fixed color ranges from 0.01 to 0.05 mol·L$^{-1}$, preferably from 0.02 to 0.04 mol·L$^{-1}$.

The process of the invention can be performed over a wide range of temperature. In general, the process is performed within the temperature range of 0 to 100° C., preferably 5 to 70° C., and more preferably 10 to 40° C. The relatively low process temperatures contribute to process efficiency and process economy, and additionally meet the current ecological demands. Indeed, the process of the invention is performed in aqueous media, and is therefore a "green process". In addition, lower temperatures have the advantage that more stable dispersions are obtained and the gold nanoparticles exhibit better redispersibility.

The present invention also concerns an aqueous gel ink with fixed color obtained according to the process of the invention, said aqueous gel comprising citric acid and derivatives, gold nanoparticles, and iron powder. In this aqueous gel ink with fixed color, citric acid and derivatives, gold nanoparticles, and iron powder, are as defined above in relation with the subject-matter of the process of the invention.

The process according to the invention enables to obtain an aqueous ink composition which exhibits a plasmon effect (plasmon color).

Depending on their size, shape, and distance, the color of the dispersion of the gold nanoparticles can change, as well as its properties. This is due to the plasmon resonance. The exposure of the gold nanoparticles to a certain frequency of waves brings the electrons to gather in a certain place, which changes in accordance with the size and shape of the gold nanoparticles. This agglomeration of electrons provokes an anisotropy of the gold nanoparticles, which will then lead to a change of light absorption and scattering, resulting in a specific color. Plasmon resonance is also affected by the distance between the gold nanoparticles due to the coupling of said gold nanoparticles. Indeed, the closer the gold nanoparticles are, the more they will interact with each other, which will increase their coupling effect also called plasmon effect. In the same way, the shape influences the plasmon resonance.

In the aqueous gel ink with fixed color of the invention, the reducing agent is present in the form of citric acid and derivatives.

In the aqueous gel ink with fixed color of the invention, the amount of citric acid and of said citric acid derivatives ranges from 5 to 15%, and preferably from 7 to 10%, by weight relative to the total weight of the aqueous gel ink.

In the aqueous gel ink with fixed color of the invention, gold nanoparticles have the shape of urchins.

In the aqueous gel ink with fixed color of the invention, the gold nanoparticles of the invention have preferably an average particle size ranging from 10 to 200 nm, and more preferably from 50 to 100 nm. This average particle size is determined by analysis of 2D images (microscope: JEOL ARM 200), according to the standard ISO9001:2015.

In the aqueous gel ink with fixed color of the invention, the amount of gold nanoparticles advantageously ranges from 0.05 to 0.5%, and more advantageously from 0.1 to 0.2%, by weight relative to the total weight of the aqueous gel ink.

In the aqueous gel ink with fixed color of the invention, the iron powder is advantageously constituted of iron nanoparticles having an average particle size ranging from 20 to 100 nm, and preferably from 30 to 60 nm. This average particle size is determined by analysis of 2D images (microscope: JEOL ARM 200), according to the standard ISO9001:2015.

In the aqueous gel ink with fixed color of the invention, the amount of iron powder advantageously ranges from 0.01 to 0.1%, more advantageously from 0.02 to 0.05%, by weight relative to the total weight of the aqueous gel ink.

In the aqueous gel ink with fixed color of the invention, the amount of water advantageously ranges from 50 to 95%, and more advantageously from 60 to 90%, and even more advantageously from 70 to 85%, by weight relative to the total weight of the aqueous gel ink.

The aqueous gel ink with fixed color of the invention may also comprise classic gel ink ingredients such as solvents, antimicrobial agents, corrosion inhibitors, antifoam agents, rheology modifiers, as described below. These gel ink ingredients are added to the gel-based matrix of aqueous ink in step (i) of the process of the invention.

The aqueous gel ink of the invention may comprise a solvent. Among the solvents that can be used, mention may be made of polar solvents miscible in water such as:

glycol ethers such as triethylene glycol, polyethylene glycol, diethylene glycol monoethyl ether, diethyleneglycol-mono butyl ether, dipropyleneglycol monobutyl ether, tripropylene glycol monomethyl ether, phenoxyethanol, phenoxypropanol, alcohols: linear or branched alcohol in $C_1$-$C_{15}$ such as isopropanol, butanol, isobutanol, pentanol, benzyl alcohol, glycerin, diglycerin, polyglycerin, esters such as ethyl acetate or propyl acetate, carbonate esters such as propylene carbonate or ethylene carbonate, ketones such as methylisobutylketone (MIBK), acetone or cyclohexanone, and mixtures thereof.

In a preferred embodiment, the solvent comprises at least a glycol ether, more specifically chosen in the group consisting of triethylene glycol, polyethylene glycol, diethylene glycol monoethyl ether, diethylene-glycol-mono butyl ether, dipropyleneglycol monobutyl ether, tripropylene glycol monomethyl ether, phenoxyethanol, phenoxypropanol, and mixtures thereof. In a further advantageous embodiment, the solvent is chosen in the group consisting of triethylene glycol, polyethylene glycol, and mixtures thereof.

Advantageously, the solvent is present in the aqueous gel ink of the invention in an amount ranging from 5 to 35%, more advantageously from 9 to 30%, and even more advantageously from 11 to 25%, by weight relative to the total weight of the aqueous gel ink.

The aqueous gel ink of the invention may comprise an antimicrobial agent such as isothiazolinone (ACTICIDE® from Thor), preferably chosen in the group consisting of 1,2-benzisothiazolin-3-one, 2-methyl-4-isothiazolin-3-one, and mixture thereof.

Advantageously, the antimicrobial agent is present in the aqueous gel ink of the invention in an amount ranging from 0.01 to 0.5%, and more advantageously from 0.1 to 0.2%, by weight relative to the total weight of the aqueous gel ink.

The aqueous gel ink of the invention may comprise a corrosion inhibitor, preferably chosen in the group consisting of tolytriazole, benzotriazole, and mixture thereof.

Advantageously, the corrosion inhibitor is present in the aqueous gel ink of the invention in an amount ranging from 0.05 to 1%, more advantageously from 0.07 to 0.5%, and even more preferably from 0.08 to 0.15%, by weight relative to the total weight of the aqueous gel ink.

The aqueous gel ink of the invention may comprise an antifoam agent, preferably a polysiloxane-based antifoam agent, and more preferably an aqueous emulsion of modified polysiloxane (such as MOUSSEX® from Synthron, TEGO® Foamex from Evonik).

Advantageously, the antifoam agent is present in the aqueous gel ink of the invention in an amount ranging from 0.05 to 1%, more advantageously from 0.1 to 0.5%, and even more advantageously from 0.2 to 0.4%, by weight relative to the total weight of the aqueous gel ink.

The aqueous gel ink of the invention may comprise a rheology modifier capable of generating a gelling effect, preferably chosen in the group consisting of xanthan gum, gum arabic, and mixture thereof.

Advantageously, the rheology modifier is present in an amount ranging from 0.1 to 2%, more preferably from 0.2 to 0.8%, and even more preferably from 0.3 to 0.6%, by weight relative to the total weight of the aqueous gel ink.

The aqueous gel ink with fixed color of the invention may also comprise other additives such as:
pH regulators like sodium hydroxide and triethanolamine,
lubricants,
coalescing agents,
crosslinking agents,
wetting agents,
plasticizers,
antioxidants, and
UV stabilizers.

When present, these additives are added to the gel-based matrix of aqueous ink in step (i) of the process of the invention.

In one aspect, the invention relates to a process for preparing in situ an aqueous ink, with fixed color comprising the following steps:
(i) preparing a matrix of aqueous ink, comprising reducing agent chosen in the group consisting of citric acid and/or derivatives of citric acid chosen from esters, amides and thioesters of citric acid, salts of citric acid or of said derivatives, solvates of citric acid or of said derivatives, such as hydrates, and mixture thereof,
(ii) adding a solution of gold salts ($Au^{3+}$),
(v) adding iron powder,
(vi) adding polyvinylpyrrolidone to obtain an aqueous ink, more specifically an aqueous gel ink with fixed color,
wherein the steps (ii) and (iii) can be interchanged.

In one aspect, the invention also relates to an aqueous ink with fixed color obtained according to the above-mentioned process, in particular comprising citric acid and derivatives, gold nanoparticles, and iron powder, in particular which are as defined in the present disclosure.

The aqueous ink with fixed color of the invention may also comprise classic ink ingredients as described previously, such as solvents, antimicrobial agents, corrosion inhibitors, antifoam agents, rheology modifiers. These ingredients are added to the matrix of aqueous ink in step (i) of the process of the invention.

In one aspect, the invention relates to the use of the aqueous ink, more specifically of the aqueous gel ink, of fixed color as defined above for writing onto an absorbing support. In one embodiment, the absorbing support is a porous substrate, specifically paper, cardboard, or textiles.

The present invention also concerns a method of writing with an aqueous ink of fixed color, more specifically with an aqueous gel ink, comprising the step of writing onto an absorbing support, wherein the absorbing support is a porous substrate, specifically paper, cardboard or textiles, with an aqueous ink with fixed color according to the invention.

After writing onto an absorbing support with the aqueous ink of fixed color of the invention, specifically the aqueous gel ink of fixed color of the invention, the distance between the gold nanoparticles within the aqueous gel ink applied on absorbing support is lower than 2 μm, preferably varies from 50 nm to 1.5 μm, and more preferably varies from 200 nm to 1 μm.

Finally, the present invention concerns a writing instrument comprising:
an axial barrel containing the aqueous ink, more specifically the aqueous gel ink, according to the invention, and
a pen body which delivers the aqueous ink stored in the axial barrel.

The writing instrument of the invention may be chosen in the group consisting of gel pens, felt pens, correction fluid, markers, and preferably gel pens.

In addition to the foregoing, the invention also comprises other provisions which will emerge from the additional description which follows, which relates to the preparation of aqueous gel inks with fixed color according to the process of the invention and comparative examples.

EXAMPLES

Example 1: Preparation of an Aqueous Gel Ink with Fixed Color Based on Citric Acid, Gold Nanoparticles, and Iron Powder, According to the Process of the Present Invention In a first step (i), a gel-based matrix of aqueous ink was prepared by mixing 15 g of triethylene glycol (solvent), 4 g of polyethylene glycol (solvent), 0.19 g of Acticide® MBS (antimicrobial agent), and 0.1 g of Additin® RC8221 (corrosion inhibitor). The mixture was homogenised with a homogenizer mixer at a speed of 15 m·s$^{-1}$ during 15 minutes and heated at a temperature of 35° C. Then, 0.4 g of xanthan gum (rheology modifier) was added to the mixture. The mixture was homogenized with a homogenizing mixer at a speed of 15 m·s$^{-1}$ during 15 minutes at a temperature of 35° C. 80.01 g of deionized water was slowly added to the mixture. The mixture was left to stand for 2 h 30. Then, 0.3 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 0.11 g of citric acid (27491 from Fluka). The mixture was homogenised with a homogenizer mixer at a speed of 400 rpm during 5 minutes.

In a second step (ii), 50 μL of a solution of gold (III) chloride trihydrate (520918-1G from Sigma-Aldrich) (200 mM) was introduced into the mixture, and homogenised at a speed of 400 rpm during 10 minutes.

After the addition of the solution of gold (III) chloride trihydrate by continuous injection, the color of the aqueous gel ink was yellow.

In a third step (iii), 0.01 g of iron powder (spherical iron powder, <10 μm, Reference: 00170, from Alfa Aesar) was added to the dispersion of gold nanoparticles obtained at the end of step (ii). The mixture was homogenized with a homogenizing mixer at a speed of 400 rpm during 5 to 10 minutes.

After the addition of the solution of silver nitrate by continuous injection, the color of the aqueous gel ink was blue.

The average particle size of the gold nanoparticles present within the aqueous gel ink is of 50 nm by analysis of 2D images (microscope: JEOL ARM 200), according to the standard ISO9001:2015.

When the obtained aqueous gel ink with fixed color was written on cellulosic paper, the color appeared immediately blue and did not change after all.

Thus, the color of the ink is the same before application on cellulosic paper and after application on cellulosic paper.

Furthermore, a visual assessment of the color of this aqueous gel ink was realized over time.

As can be seen from Table 1, the color of the aqueous gel ink did not change over time.

TABLE 1

Example 1 - Visual assessment of the color of aqueous gel ink over time

| Time | 0 min | 2 min | 1 hour | 1 day | 1 week |
|---|---|---|---|---|---|
| Color of the aqueous gel ink before application onc cellulosi paper | blue | blue | blue | blue | blue |
| Color of the aqueous gel ink after application on cellulosic paper | blue | Blue | blue | blue | blue |

Comparative Example 1: Preparation of an Aqueous Gel Ink Based on Citric Acid and Gold Nanoparticles, without Iron Powder In a first step, a gel-based matrix of aqueous ink was prepared by mixing 15 g of triethylene glycol (solvent), 4 g of polyethylene glycol (solvent), 0.19 g of Acticide® MBS (antimicrobial agent), and 0.1 g of Additin® RC8221 (corrosion inhibitor). The mixture was homogenised with a homogenizer mixer at a speed of 15 m·s$^{-1}$ during 15 minutes and heated at a temperature of 35° C. Then, 0.4 g of xanthan gum (rheology modifier) was added to the mixture. The mixture was homogenized with a homogenizing mixer at a speed of 15 m·s$^{-1}$ during 15 minutes at a temperature of 35° C. 80.01 g of deionized water was slowly added to the mixture. The mixture was left to stand for 2 h 30. Then, 0.3 g of Moussex® S 9092 (antifoam agent) was added. The mixture was homogenized with a homogenizing mixer at a speed of 15 m·s$^{-1}$ during 30 minutes at a temperature of 35° C. The gel-based matrix of aqueous ink obtained was cooled at room temperature (25° C.). Then, 1 mL of the obtained gel-based matrix of aqueous ink was mixed with 0.11 g of citric acid (27491 from Fluka). The mixture was homogenised with a homogenizer mixer at a speed of 400 rpm during 5 minutes.

In a second step, 50 μL of a solution of gold (III) chloride trihydrate (520918-1G from Sigma-Aldrich) (200 mM) was introduced into the mixture, and homogenised at a speed of 400 rpm during 10 minutes. After the addition of the solution of gold (III) chloride trihydrate by continuous injection, the color appeared yellow.

When the obtained aqueous gel ink was written on cellulosic paper, the color did not change and remained yellow.

Furthermore, a visual assessment of the color of this aqueous gel ink on cellulosic paper was realized over time.

As can be seen from Table 2, the color of the aqueous gel ink on cellulosic paper appears brown after 1 week.

Thus, the color of the ink is not the same before application on cellulosic paper and after application on cellulosic paper over time.

TABLE 2

Comparative example 1- Visual assessment of the color of aqueous gel ink over time

| Time | 0 min | 2 min | 1 hour | 1 day | 1 week |
|---|---|---|---|---|---|
| Color of the aqueous gel ink before application on cellulosic paper | yellow | yellow | yellow | yellow | yellow |
| Color of the aqueous gel ink after application on cellulosic paper | yellow | yellow | yellow | yellow | brown |

The invention claimed is:

1. A process for preparing in situ an aqueous gel ink with fixed color comprising the following steps:
   (i) preparing a gel-based matrix of aqueous ink comprising a reducing agent selected from the group consisting of citric acid, derivatives of citric acid including esters, amides, and thioesters of citric acid, salts of citric acid, salts of said derivatives of citric acid, solvates of citric acid including hydrates, solvates of said derivatives of citric acid including hydrates, and mixtures thereof,
   (ii) adding a solution of gold (III) salts,
   (iii) adding iron powder, and
   (iv) adding polyvinylpyrrolidone to obtain an aqueous gel ink with fixed color,
   wherein the steps (ii) and (iii) can be interchanged.

2. The process according to claim 1, wherein said reducing agent is selected from the group consisting of citric acid, said esters of citric acid, said salts of citric acid, said solvates of citric acid, solvates of said esters of citric acid, and mixtures thereof.

3. The process according to claim 1, wherein the gel-based matrix of aqueous ink includes citric acid and said derivatives of citric acid, and wherein a concentration of citric acid and said derivatives of citric acid in the gel-based matrix of aqueous ink of step (i) ranges from 0.10 to 0.50 mol·L$^{-1}$.

4. The process according to claim 1, wherein a concentration of said gold (III) salts in the gel-based matrix of aqueous ink of step (ii) ranges from 0.001 to 0.1 mol·L$^{-1}$.

5. The process according to claim 1, wherein a concentration of said iron powder in the gel-based matrix of aqueous ink of step (iii) ranges from 0.01 to 0.05 mol·L$^{-1}$.

6. The process according to claim 1, wherein a concentration of said polyvinylpyrrolidone in the aqueous gel ink of step (iv) ranges from 0.005 to 0.1%.

7. An aqueous gel ink with fixed color obtained according to the process of claim 1, comprising citric acid and said derivatives of citric acid, said gold (III) salts, wherein said gold (III) salts are to produce gold nanoparticles, and said iron powder.

8. The aqueous gel ink according to claim 7, wherein a total amount of citric acid and of said derivatives of citric acid in said aqueous gel ink ranges from 5 to 15% by weight relative to a total weight of the aqueous gel ink.

9. The aqueous gel ink according to claim 7, wherein the gold nanoparticles have an average particle size ranging from 10 to 200 nm.

10. The aqueous gel ink according to claim 7, wherein the gold nanoparticles have a shape of urchins.

11. The aqueous gel ink according to claim 7, wherein an amount of said gold nanoparticles in the aqueous gel ink ranges from 0.05 to 0.5% by weight relative to total weight of the aqueous gel ink.

12. The aqueous gel ink according to claim 7, wherein an amount of said iron powder in the aqueous gel ink ranges from 0.01 to 0.1% by weight relative to a total weight of the aqueous gel ink.

13. The aqueous gel ink according to claim 7, further comprising water, wherein an amount of said water in the aqueous gel ink ranges from 50 to 95% by weight relative to a total weight of the aqueous gel ink.

14. The aqueous gel ink according to claim 7, further comprising:

a solvent; and/or a corrosion inhibitor, in an amount ranging from 0.05 to 1% by weight relative to a total weight of the aqueous gel ink; and/or an antifoam agent, in an amount ranging from 0.05 to 1% by weight relative to the total weight of the aqueous gel ink; and/or a rheology modifier, in an amount ranging from 0.1 to 2% by weight relative to the total weight of the aqueous gel ink; and/or an antimicrobial agent, in an amount ranging from 0.01 to 0.5% by weight relative to the total weight of the aqueous gel ink.

15. A writing instrument comprising:

an axial barrel containing the aqueous gel ink with fixed color according to claim 7, and a pen body which delivers the aqueous gel ink stored in the axial barrel, wherein the writing instrument is selected from the group consisting of gel pens, felt pens, correction fluid, and markers.

* * * * *

UNITED STATES PATENT AND TRADEMARK OFFICE
CERTIFICATE OF CORRECTION

| | | |
|---|---|---|
| PATENT NO. | : 12,497,525 B2 | Page 1 of 1 |
| APPLICATION NO. | : 17/630814 | |
| DATED | : December 16, 2025 | |
| INVENTOR(S) | : Albenge et al. | |

It is certified that error appears in the above-identified patent and that said Letters Patent is hereby corrected as shown below:

In the Claims

Column 11, Line 8, in Claim 11, after "relative to" insert --a--.

Signed and Sealed this
Tenth Day of February, 2026

John A. Squires
*Director of the United States Patent and Trademark Office*